May 12, 1970   J. Q. HUEY, JR   3,511,681
DECORATION FOR CERAMIC ARTICLES
Filed Jan. 15, 1968
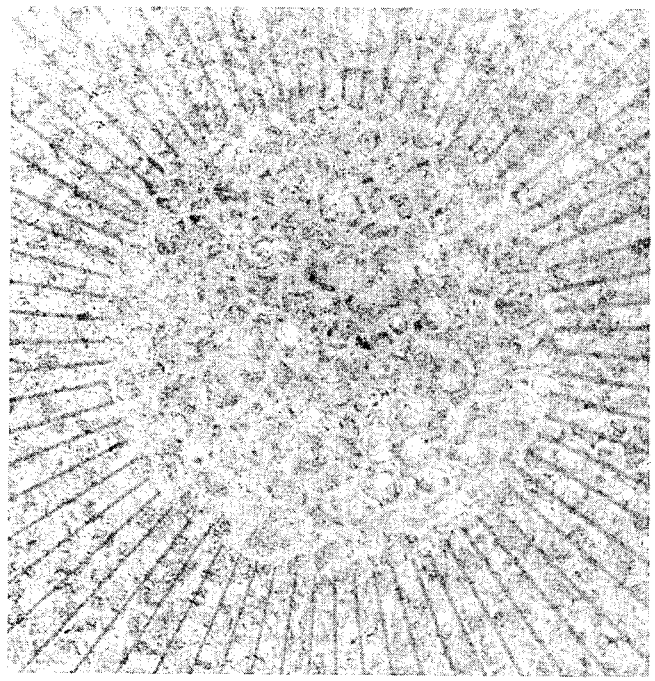
INVENTOR.
James Q. Huey, Jr
BY
ATTORNEY

United States Patent Office 3,511,681
Patented May 12, 1970

3,511,681
DECORATION FOR CERAMIC ARTICLES
James Q. Huey, Jr., Winchester, Va., assignor to Corning
Glass Works, Corning, N.Y., a corporation of New
York
Filed Jan. 15, 1968, Ser. No. 697,852
Int. Cl. B44d 1/14; C03c 17/32, 21/00
U.S. Cl. 117—45 4 Claims

ABSTRACT OF THE DISCLOSURE

This invention relates to the decorating of glass-ceramic articles through the staining thereof wherein random patterns and different colors can be incorporated into the surface of glass-ceramic articles in a single staining and firing operation. The decorating is accomplished by applying a staining material and an organic base breakup material, such as gum arabic, to a glass-ceramic article and then firing the coated article at a temperature such that the stain will diffuse within the article and concurrently therewith the organic base breakup material acts to disperse the staining material into random patterns which results in the article being stained in the random patterns.

---

Glass-ceramic articles are produced through the controlled crystallization of glass articles. Thus, in general, a glass-forming batch to which a nucleating agent may, opentionally, be added is melted, the melt then cooled to a glass article of a desired shape, and this glass article subjected to a heat treating procedure. The heat treating procedure conventionally consists of two steps: first, the glass article is heated to a temperature in the vicinity of the annealing point of the glass to induce nucleation thereof; and, second, the nucleated article is heated to a higher temperature to cause the growth of crystals on the nuclei. The glass-ceramic article is composed of relatively uniformly fine-grained crystals dispersed in a glassy matrix, the crystals comprising the predominant portion of the article. The physical properties exhibited by a glass-ceramic article normally are materially different from those exhibited by the original glass and are more closely akin to those of the crystals present therein. Also, since a glass-ceramic article is made through the crystallization in situ of a glass article, it is free of voids and non-porous. For a more detailed study of the structure and production of glass-ceramic articles, reference is made to U.S. Pat. No. 2,920,971.

The art of staining glass articles with copper and/or silver compounds is at least several hundred years old. In the conventional practice, a silver or copper salt or mixtures thereof is blended with ochre or other dispersing agent and then water or an organic liquid is added to form a slurry. This slurry is applied to the article and the article fired at a sufficiently high temperature such that straining is effected. The mechanism for staining involves the replacement of alkali metal ions in the glass, normally sodium, with copper and/or silver ions. It is this ion exchange reaction accompanied by the diffusion of the coloring ions within the surface of the glass article which endows this method of decorating glass articles with a most important characteristic, viz, permanency.

As has been explained above, a glass-ceramic article is predominantly crystalline, i.e., the crystal phase therein comprises more than 50% by weight of the article and, commonly, more than 75% by weight. And, by the very nature of its manufacture and structure, the alkali metal content thereof must be essentially all in the crystal phase rather than in the residual glass. Thus, the presence of any substantial amount of alkali metal beyond that required for the development of crystals would result in extensive softening of the original glass during the heat treatment thereof to convert the glass article to a glass-ceramic. In general, then, the residual glass will consist essentially of silica wtih, perhaps other network forming ingredients such as alumina or boric oxide if such are present in the original glass. In recent years it has been demonstrated that ion exchange reactions can occur between copper and/or silver ions and lithium and/or sodium ions present in the crystal phase of a glass-ceramic article and staining of the article effected thereby.

A second method for decorating glass-ceramic articles is described in U.S. Pat. No. 3,313,644 wherein such articles are stained utilizing compounds of iron, cobalt, or nickel. In carrying out that invention, a substantially fluxfree decorating composition consisting of a compound of at least one of the metals is applied to the glass-ceramic article and the article then heated to between about 900°–1175° C. for about 1–4 hours. Through some sort of a solid state reaction, coloration is infused within the surface of the article thereby staining it. The mechanism for the infusion and consequent staining of the article was deemed to be a solid state reaction rather than an ion exchange reaction since the metals involved, viz, iron, cobalt, and nickel, were not known to take part in ionic exchanges with alkali metals such as have been described above with reference to copper and silver staining.

Nevertheless, whereas these two methods for producing stains are very useful in decorating or marking glass-ceramic articles, for specific design effects a method has been sought for providing stains that would demonstrate random broken patterns and colors.

Therefore, the primary object of my invention is to furnish a method for decorating a glass-ceramic article through staining resulting from ion exchange or solid state reaction wherein the stain will have a random broken pattern exhibiting different colors and effects.

I have discovered that this object, as illustrated in the appended figure, can be achieved through a similar modification in each of the two above-described staining techniques. Thus, in my invention, a staining composition is first applied to the surface of a glass-ceramic article wherein the principal crystal phase contains lithium and/or sodium ions, then an organic base breakup material is applied over the stain-coated area, and, finally, the article is fired at a sufficiently high temperature to bring about the ion exchange or solid state reaction and to permit the breakup material to cause the concentration of the staining composition in random areas on the article such that the resultant staining will be in broken patterns. Where the staining is brought about through a solid state reaction, the composition of the glass-ceramic article is not critical. Hence, any glass-ceramic composition is operable and the presence of lithium and/or sodium ions is optional only.

The ion exchange staining of a glass article must be undertaken at a temperature below the softening point of the glass to avoid deformation of the article. However, since the "softening point" or the deformation point of a glass-ceramic article is considerably higher in temperature than the softening point of the original glass article, higher ion exchange temperatures can be utilized. Because of this factor, it has been learned that sufficient exchange can be induced between lithium and sodium ions present in crystals within glass-ceramic articles and other of the noble metals, viz, gold, palladium, and platinum, such that these metals can be employed as staining colors for glass-ceramic articles as well as copper and silver.

In carrying out my invention, the oxide or other compound of the coloring metal may be used in concentrated form or diluted in combination with a material which is relatively inert with respect to the glass-ceramic article at the exchange temperature employed. In general terms, the method of the invention comprises grinding together and/or intimately mixing the staining compound and diluent, if any, with a proper amount of a suitable vehicle, e.g., water, alcohol, or various organic screening media, such as squeegee oil. This suspension is then applied to the glass-ceramic article by any suitable means such as spraying, brushing, or silk screening and dried thereon, either at room temperature or at some elevated temperature normally below about 200° C.

As breakup materials, I have found the gums to be particularly useful. Gums are thick, mucilaginous exudations from various plants formed by the conversion of the cell walls and are generally classified into three types: (1) the Arabin type of which gum arabic and Indian gum are illustrative that are completely soluble in water; (2) the Bassorin type of which tragacanth and satinwood gum are illustrative that are slightly soluble in water; and (3) the Cesarin type of which cherry gum and sassa gum are illustrative that swell in water. Of these types, the Arabin class is the only suitable type of gum for this invention because of its complete solubility in water.

A mixture of an Arabin-type gum and water with, optionally, a small amount of a deflocuulant or dispersing agent is applied over the stain-coated area of the glass-ceramic article and dried thereon, this drying also being undertaken either at room temperature or at a somewhat elevated temperature preferably below 100° F. At temperatures much above about 100° F., flaking off of the gum coating is hazarded. The double-coated article is then fired at a temperature between about 500°–1175° C., in the case of the ion exchange process, for a period of time of such duration to effect sufficient ion exchange between the alkali metal ions of the crystals and the noble metal ions of the stain to produce the desired coloration within the glass-ceramic surface while, concurrently, the gum physically acts upon the staining compound and causes concentrations thereof in random areas such that broken stain patterns result. This firing time commonly ranges about ½–8 hours. Where a solid state reaction involving iron, cobalt, nickel, or compounds thereof is utilized to produce the stain, a minimum temperature of about 900° C. and a reaction time of about 1–8 hours are required. It can be appreciated that somewhat longer firing times may be employed in either process with no deleterious effect but such are not commercially attractive.

As has been explained above, any glass-ceramic article may be stained by the ion exchange method of this invention wherein the principal crystal phase therein contains lithium and/or sodium ions. Table I records four compositions, expressed in weight percent on the oxide basis, of several glass-ceramic articles which have major crystalline phases containing lithium or sodium ions and are, therefore, operable in the instant invention. For further examples of suitable compositions, reference is made to U.S. Pats. Nos. 3,146,114, 2,920,971, 3,157,522, and 3,201,266. As has been observed above, the solid state reaction process is operable with any glass-ceramic article and reference is made to U.S. Pat. No. 3,313,644 for illustrative compositions.

TABLE I

| | 1 | 2 | 3 | 4 |
|---|---|---|---|---|
| $SiO_2$ | 71.0 | 72.7 | 43.4 | 50.2 |
| $Al_2O_3$ | 18.0 | 16.8 | 30.3 | 26.0 |
| $Li_2O$ | 2.5 | 4.0 | | |
| $Na_2O$ | | | 14.1 | 16.68 |
| MgO | 3.0 | 3.0 | | 2.16 |
| ZnO | 1.0 | | | |
| BaO | | | 6.5 | |
| $TiO_2$ | 4.5 | | 5.7 | 4.96 |
| $ZrO_2$ | | 3.5 | | |

Batch ingredients for the above glasses were melted in crucibles, pots, or tanks, depending upon the size of the melt desired, at temperatures between about 1400°–1600° C. The melting was generally carried out under oxidizing conditions to avoid the fining difficulties commonly encountered in melting under reducing conditions. In the large melts, the conventional fining agent, $As_2O_3$, was added to the batch materials. After the melts had been shaped into glass articles of the desired configuration, these glass shapes were converted to glass-ceramic articles through heat treatments carried out between about 800°–1200° C. The principal crystal phase present in Example 1 is beta-spodumen, in Example 2 is stuffed beta-quartz (a $Li_2O$-MgO-$Al_2O_3$-$SiO_2$ crystal), in Example 3 is nepheline and hexacelsian, and in Example 4 is nepheline. Thus, in Examples 1 and 2, the principal crystal phase contains lithium ions whereas in Examples 3 and 4, the principal crystal phase contains sodium ions.

Table II records various staining compounds which were applied to the glass-ceramic articles and the breakup material superposed thereupon expressed in weight percent with the vehicle in the case of the staining compounds and water in the case of the breakup material comprising the balance. In each of the listed experiments, both the staining compound and the breakup material were silk screened onto the article utilizing squeegee oil as the organic vehicle. About 5% methanol or isopropanol was utilized as a deflocculant or dispersing agent for the water-gum solution. Table II also records the firing treatment utilized in each experiment and the resulting color of the stain.

TABLE II

| Experiment No. | Body Composition | Staining compound Color agent | Staining compound Diluent | Breakup agent | Temp.,°C. | Time (hr.) | Color |
|---|---|---|---|---|---|---|---|
| 1 | 1 | 20PbO | $30MoO_3$4$Fe_2O_3$ | 20 gum arabic | 750 | 1 | Gray. |
| 2 | 1 | 20CoO | $30TiO_3$1$Al_2O_3$ | 15 gum arabic | 1,100 | 8 | Blue. |
| 3 | 1 | 25NiO | $25Fe_2O_3$ | 50 gum arabic | 1,100 | 8 | Golden brown. |
| 4 | 2 | 10PtO | 20AgO10AuO | 40 gum arabic | 900 | 1 | Platinum. |
| 5 | 3 | 30CoO | $20Fe_2O_3$10$Cr_2O_3$ | 60 gum arabic | 1,100 | 8 | Black. |
| 6 | 4 | $50Fe_2O_3$ | | 20 gum arabic | 1,100 | 8 | Yellow. |
| 7 | 1 | 30CuO | | 25 gum arabic | 700 | 4 | Copper. |
| 8 | 1 | 20AgO | | 30 gum arabic | 700 | 6 | Amber. |

The above table illustrates the various colors which can be obtained through the practice of the invention. Experiment 1 reports the preferred embodiment of my invention and the patterns attained thereby are pictured in the appended figure.

I claim:

1. In the method for decorating a glass-ceramic article by applying as a coating to a selected portion of the surface of a glass-ceramic article, having a lithium and/or sodium ion-containing crystal as the principal crystal phase, a staining composition including at least one coloring agent selected from noble metal compounds of the group consisting of copper, silver, gold, palladium, and platinum and firing said coated article at a temperature between about 500°–1175° C. for a period of time sufficient for said noble metal ions to exchange within the surface of the article with said lithium and/or sodium ions to thereby stain said article, the improvement which comprises applying a mixture of an Arabin-type gum in water over said coating containing a coloring agent prior to said firing step such that, upon firing, said mixture disperses the staining composition to form random patterns in the article.

2. A method according to claim 1 wherein said coating containing at least one noble metal compound is fired for about ½–8 hours.

3. In the method for decorating a glass-ceramic article by applying as a coating to a selected portion of the surface of the article a substantially flux-free staining composition containing at least one coloring agent selected from the group consisting of iron, cobalt, and nickel and compounds thereof and firing said coated body between about 900°–1175° C. for a period of time sufficient to cause said coloring agent to penetrate within and below the surface of said portion and enter into a solid state reaction therewith thereby staining said article, the improvement which comprises applying a mixture of an Arabin-type gum in water over said coating containing a coloring agent prior to said firing step such that, upon firing, said mixture disperses the staining composition to form random patterns in the article.

4. A method according to claim 3 wherein said coating containing at least one coloring agent selected from the group consisting of iron, cobalt, and nickel and compounds thereof is fired for about 1–8 hours.

References Cited

UNITED STATES PATENTS

| | | | |
|---|---|---|---|
| 3,313,644 | 4/1967 | Morissey | 117—37 |
| 3,266,912 | 8/1966 | Murphy | 65—33 |
| 2,428,600 | 10/1947 | Williams | 117—160 |

ALFRED L. LEAVITT, Primary Examiner

M. F. ESPOSITO, Assistant Examiner

U.S. Cl. X.R.

65—33, 60; 117—123, 124, 160